(12) United States Patent
Segat

(10) Patent No.: US 11,175,682 B2
(45) Date of Patent: Nov. 16, 2021

(54) ADJUSTMENT AND REMOTE CONTROL SYSTEM WITH A PRESSURE REGULATOR FOR IRRIGATION SYSTEMS

(71) Applicant: Kléryston Lasiê Segat, Horizontina (BR)

(72) Inventor: Kléryston Lasiê Segat, Horizontina (BR)

( * ) Notice: Subject to any disclaimer, the term of this patent is extended or adjusted under 35 U.S.C. 154(b) by 0 days.

(21) Appl. No.: 16/538,871

(22) Filed: Aug. 13, 2019

(65) Prior Publication Data

US 2021/0011501 A1  Jan. 14, 2021

(30) Foreign Application Priority Data

Jul. 9, 2019 (BR) .......................... 1020190141700

(51) Int. Cl.
| | | |
|---|---|---|
| *F16K 31/128* | (2006.01) | |
| *G05D 16/20* | (2006.01) | |
| *G05D 7/01* | (2006.01) | |
| *F16K 7/17* | (2006.01) | |
| *F16K 7/16* | (2006.01) | |

(52) U.S. Cl.
CPC ....... *G05D 16/2022* (2019.01); *G05D 16/204* (2013.01); *F16K 7/16* (2013.01); *F16K 7/17* (2013.01); *F16K 31/128* (2013.01); *G05D 7/0113* (2013.01)

(58) Field of Classification Search
CPC ............. G05D 16/2022; G05D 16/204; G05D 7/0113; F16K 31/128; F16K 7/16; F16K 7/17

USPC ............ 137/487.5, 488, 490, 489.5, 115.19, 137/115.24, 115.25, 115.28, 119.09, 137/119.1, 625.64, 596.16, 487, 505.22, 137/505.36, 315.05; 251/12, 30.01, 331
See application file for complete search history.

(56) References Cited

U.S. PATENT DOCUMENTS

| | | | | |
|---|---|---|---|---|
| 4,203,465 A | * | 5/1980 | Rissi .................. | F02M 65/00 137/487.5 |
| 4,615,174 A | * | 10/1986 | Nagahara ............ | F15B 13/0422 60/442 |
| 4,638,837 A | * | 1/1987 | Buike .................. | B62D 5/06 137/596.16 |
| 4,961,441 A | * | 10/1990 | Salter ................. | G05D 16/2053 137/14 |
| 5,016,665 A | * | 5/1991 | Konieczynski ....... | B05B 12/004 137/1 |

(Continued)

*Primary Examiner* — Minh Q Le
(74) *Attorney, Agent, or Firm* — Scott Houtteman; Houtteman Law LLC

(57) ABSTRACT

Adjustment and remote control system with a pressure regulator for irrigation systems to regulate the water pressure at the outlet, and consequently its flow, being crucial to assure the uniformity and the quantity of water as applied. In the adjustment and remote control system for pressure in irrigation systems, the electronic control board is informed of the target pressure at the outlet of the pressure regulator as disclosed in this document; it reads the current pressure of the adjustment and control system by means of the electronic pressure sensor and, if the pressure is lower than the target, a solenoid valve for pressure increase is activated, using the pressure generated by a pressure generator in any given fluid, and, if the pressure is higher, that pressure is reduced.

9 Claims, 1 Drawing Sheet

(56) References Cited

U.S. PATENT DOCUMENTS

| | | | | |
|---|---|---|---|---|
| 5,020,564 A | * | 6/1991 | Thoman | G05D 16/2053 137/102 |
| 6,305,401 B1 | * | 10/2001 | Uehara | G05D 16/2095 137/102 |
| 6,584,999 B2 | * | 7/2003 | Inayama | G05D 16/2024 137/487.5 |
| 6,595,231 B1 | * | 7/2003 | Best | G05D 16/2095 137/14 |
| 6,779,541 B2 | * | 8/2004 | Inayama | G05D 16/2095 137/102 |
| 8,317,154 B2 | * | 11/2012 | Kleegrewe | G05D 16/163 251/29 |
| 8,847,103 B2 | * | 9/2014 | Retnaswamy | B23K 9/013 219/121.55 |
| 10,409,298 B2 | * | 9/2019 | Ponzo | G05D 16/2013 |
| 10,465,817 B2 | * | 11/2019 | Sneh | G05D 7/0113 |
| 10,578,065 B1 | * | 3/2020 | Yu | G05D 16/0638 |
| 2004/0206400 A1 | * | 10/2004 | Ando | G05D 16/0663 137/487.5 |
| 2010/0035117 A1 | * | 2/2010 | Takeshita | H01M 8/04089 429/412 |
| 2010/0108256 A1 | * | 5/2010 | Roajanasiri | G11B 5/4826 156/291 |
| 2014/0087629 A1 | * | 3/2014 | Takahashi | B24B 37/005 451/5 |
| 2014/0358289 A1 | * | 12/2014 | Davies | G05D 16/2093 700/275 |
| 2015/0211552 A1 | * | 7/2015 | Burgett | G05B 19/045 137/625.64 |
| 2016/0161956 A1 | * | 6/2016 | Baca | G05D 16/2013 137/487.5 |
| 2018/0355997 A1 | * | 12/2018 | Tuineag | F28F 27/00 |

* cited by examiner

ADJUSTMENT AND REMOTE CONTROL SYSTEM WITH A PRESSURE REGULATOR FOR IRRIGATION SYSTEMS

BRIEF SUMMARY OF THE INVENTION

The present invention refers to an adjustment and remote control system with a pressure regulator for irrigation systems, with the object to regulate the water pressure at the outlet, and consequently its flow, being crucial to assure the uniformity/quantity of the water as applied.

The growing worldwide demand for food requires us to have more and more improvements in food quantity and quality. Water is one of the main items in the system, both for its importance and for its direct and indirect cost, being additionally a finite element, which should thus be used with conscience and efficiency. A precise dosage of the water quantity in the culture directly interferes with the cycle of vegetation, incidence of pests and consequently the productivity/quality of the food as produced; and also with the quality of the soil to be reused for the next cultures.

In the beginning of the cycle of vegetation, the plant requires little water, being the flow reduced by using an adjustable pressure regulator, thus increasing the efficiency of the irrigation system, reducing the instantaneous precipitation and improving the percentage of water absorption by the soil and by the plant. In a drought situation and/or vegetation cycle of fructification, wherein the demand for water is high, that system may prioritize pressure increase on the nozzles/orifices, consequently increasing the volume of water delivered in less time.

Various solutions have been developed, aiming to reach a more precise water supply, so to reduce costs and consumption for the various cultures. The document CN207340902 e. g. discloses an irrigation device with remotely manageable irrigation control.

A few solutions in patent documents, such as the patent application CN204579365 and the document CN104604649, disclose solutions with electronically controlled systems at low cost for large extension crops.

The current system with the lowest cost, commonly used to assure water dosage in agricultural irrigation, has lower technology, thus being more mechanical than electronic. The frequent production of low cost products handicaps investments in complex technologies, and simpler systems are chosen. Generally speaking, a widely known system is constituted by two main components: a pressure regulator and a nozzle/orifice for water outlet. When the quantity of water to be applied by the irrigation system must be controlled, there are only three variable parameters: nozzle/orifice diameter, applied pressure and irrigation time. The diameter and the pressure are physical changes in the system requiring time and resources to be performed, thus the irrigation time remains as a single viable management alternative today.

Said regulators are built to work under fixed pressure, which is individually calibrated at the time of their manufacture. The working principle is based on the force imposed by a spring over a diaphragm, connected to the plunger, against the outlet pressure effort of the water over the diaphragm.

These devices have a few problems, mainly related to their manufacture, such as the spring, due to the form of construction, material used, number of coils and repetitions in the building process, interfering with the final performance of the pressure regulator. Furthermore, the spring must be specific for the manufacture of each regulator so to generate specific pressure. Also, individual calibration per regulator is required, and spring wedge rings must be included, so to assure precise adjustment of the strength as applied by the spring.

There are also problems related to the use of the equipment, e. g. concerning the quality of the spring, interfering in hysteresis and consequently in the outlet pressure variation as a function of inlet pressure variation in the regulator. The flow range of that equipment is very strict, since the regulator flow depends on the inlet pressure and the position of the plunger, and changes in the position of the plunger alter the spring compression, varying the force on the diaphragm and consequently the outlet pressure.

It is also well known that the spring is an item suffering stress and ageing, which change its characteristics and consequently alters the working pressure of the regulator during its working life. As a solution, the manufacturers inform the working time in hours of use for their regulators, recommending their substitution after that period. This advice is most of the times neglected by the users, causing failure in irrigation and/or waste of natural resources.

The present invention is a technical solution to create irrigation systems with variable flow and remote control, simply and at low implementation cost, based on the variation of the water pressure on the nozzles/orifices. The possibility of altering the pressure and consequently the flow in an irrigation system allows controlling pressure drops in piping. Altering the flow and consequently the speed of the water is to have in hands the possibility of adjusting the yielding in the irrigation system as a function of water demand. The present invention discloses a system linked to a regulator device to change the irrigation flow remotely, instantaneously and with low installation cost, based on the water pressure variation at the regulator outlet.

In the adjustment and remote control system for pressure for irrigation systems, the electronic control board is informed of the target pressure at the outlet of the pressure regulator as disclosed in this document; it reads the current pressure of the adjustment and control system by means of the electronic pressure sensor and, if the pressure is below the target, the solenoid valve (61) to increase pressure is activated, by using the pressure generated by a pressure generator for a fluid, e. g. an air compressor, and, if higher, the pressure is reduced.

The pressure regulator as mentioned above has an embodiment solving all the inconveniences in the current state of the art, implementing a new way to think of irrigation, allowing to assemble irrigation systems with variable flow at low implementation cost, based on the water pressure variation on the nozzles/orifices. Furthermore, the device may work remotely, with no need of any physical/mechanical intervention in the installed system.

The operation of the pressure regulator is based on the plunger displacement, creating more or less pressure drop inside the regulator. Said plunger is fixed to a diaphragm, which, on one of its faces, suffers the effort caused by the water outlet pressure, forcing the plunger to be displaced so to restrict the water inlet, thus reducing the outlet pressure. On the other face of the diaphragm, there is the pressure control chamber which, according to its internal pressure, will exert an opposite force, causing the displacement of the plunger so to release the water inlet. With the regulator in operation, the plunger is displaced until finding a position wherein the water outlet pressure is the same as the pressure in the pressure control chamber.

Therefore, the present invention discloses an irrigation system which embodiment is simple, cheap and especially smart, which main object is to optimize the use of natural resources such as water and electricity, e. g. by enabling the embodiment of the system as disclosed herein, wherein the irrigation control method prioritizes the cost reduction of the liter of water as applied in the culture. Furthermore, it allows for flexibility in the use of the irrigation system, for creating handling possibilities for the cultures, giving autonomy for the user to change the cost per liter of irrigated water, which was previously an immutable characteristic due to the embodiment characteristics of the already existing technologies in the market and, with the system disclosed by this document, the cost may be changed in real time. The system also provides for integration with software and culture management tools, for a better cost/efficacy result of the irrigation system.

DESCRIPTION OF THE DRAWINGS

The description below and the related figures as examples will bring better understanding of the object of the present invention.

DETAILED DESCRIPTION OF THE INVENTION

Figure 1:
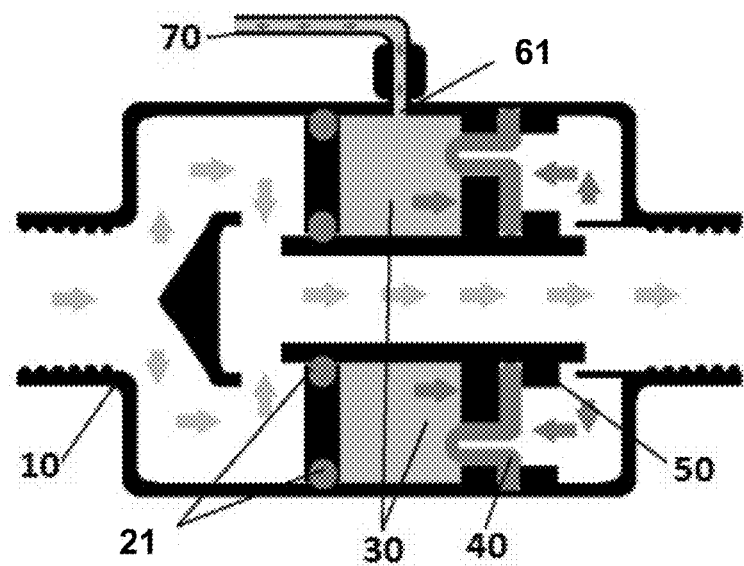
FIG. 1 shows an embodiment scheme of the pressure regulator for irrigation systems.
Figure 2:
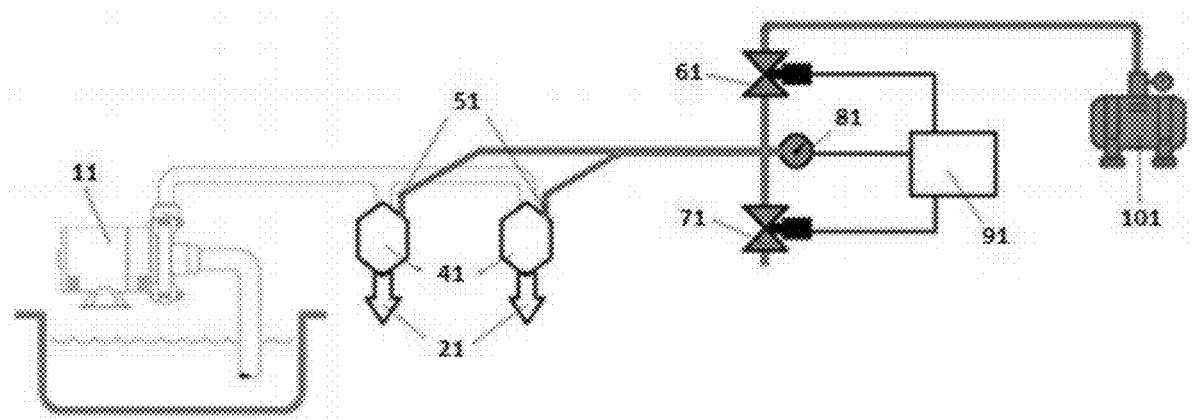
FIG. 2 shows a scheme of the pressure adjustment and remote control system.

The pressure adjustment and remote control system for irrigation systems comprises an electronic control board (91), a pressure regulator (41), an electronic pressure sensor (81), a solenoid valve for pressure increase (61), a pressure generator for fluids, preferably and air compressor (101), a solenoid valve for pressure reduction (71), tubes (51), and nozzles/orifices (21).

In the pressure adjustment and remote control system for irrigation systems, the electronic control board (90) is informed of the target pressure on the nozzles/orifices (21). It reads the current pressure in the adjustment and control system by means of the electronic pressure sensor (81). If the pressure is below the target, the solenoid valve for pressure increase (61) is activated, by using the pressure generated by the pressure generator for fluids (101). If the pressure is above the target, the solenoid valve for pressure reduction (71) is activated. This process generates controlled pressure inside the reference pressure tubes (51) which, on the other hand, adjust the water outlet pressure in the guided pressure regulators (41), thus varying the water flows on the nozzles/orifices (20).

Based on the figures, the embodiment of the mechanical pressure regulator for irrigation systems has the ability to remotely adjust the water outlet pressure, by means of a guiding system activated by air, water, oil or any other liquid or gaseous fluid, as an external pressure reference. Its functional principle, as presented by FIG. 1, is based on the displacement of the plunger (50) creating more or less pressure drop inside the regulator.

The pressure regulator (41) comprises a plunger (50) having a protuberance connected to one of the faces of a diaphragm (40), so to allow the plunger (50), which is located crosswise to the diaphragm (40), to be displaced towards the water inlet, clogging it. On the other face of the diaphragm (40), the pressure control chamber (30) is located, filled in with fluid, so to displace the plunger (50) to the opposite direction to the water inlet.

The operation of the pressure regulator (41) is performed from the plunger (50), which is fixed crosswise to a diaphragm (40), so that said plunger (50) suffers the effort on one of its faces, caused by the water outlet pressure, forcing the plunger (50) to be displaced so to restrict the entrance of water, thus reducing the outlet pressure. On the other side of the diaphragm (40), on its other face, the pressure control chamber (30) is located, which, according to the pressure inside it, regulated by the fluid feed received from the pilot tube (70) connected to the chamber by the connection orifice (60), will exert an opposite force, making the plunger (50) to be displaced, so to release the entrance of water. With the regulator in operation, the plunger (50) is displaced until finding a position wherein the water outlet pressure is the same as the pressure in the pressure control chamber (30).

Therefore, the working principle of said pressure regulator (41) is based on displacing the plunger (50), thus creating more or less pressure drop inside the regulator. Embodiment variants of said pressure regulator (41) may exist, concerning its shape, number of chambers or constructive parts, but not losing the characteristics of the inventive concept as disclosed herein.

The invention claimed is:

1. A method of maintaining a preset water output pressure in an agricultural irrigation system, comprising:
   providing a pressure regulator comprising:
      a water inlet,
      a water outlet,
      an internal pressure control chamber comprising an external reference pressure inlet, a diaphragm connected to a piston and said pressure control chamber sealed by an O-ring;
   providing an external reference pressure from a pump, and a solenoid valve for increasing or reducing pressure in the pressure control chamber based on the presetting external reference pressure;
   wherein said pressure control chamber inlet receives an external reference pressure selected from the group consisting of pressurized air, water, oil, other liquid, and other gas;
   transmitting said preset external reference pressure to the pressure control chamber to causes movement of the diaphragm, and said movement of the diaphragm causes the piston to move linearly forward or backward; and
   simultaneously with the transmitting of said preset external reference pressure, transmitting water to the pressure regulator so that said water either exerts a pressure on an external face of the diaphragm so that the external face of the diaphragm moves, and said movement of the diaphragm causes the piston to move linearly forward or backward;
   said method being configured so that when water pressure at the water inlet is greater than the external reference pressure in the pressure control chamber, said water inlet pressure acts on the diaphragm moving the piston toward the water inlet such that water flow at the water inlet is restricted until the water outlet pressure matches the external reference pressure of the pressure control chamber, and if pressure at the water inlet is less than the external reference pressure in the pressure control chamber, said external reference pressure acts on the diaphragm moving the piston toward the water outlet such that water flow at the water inlet is derestricted until the water outlet pressure matches the external reference pressure of the pressure control chamber.

2. The method according to claim 1 wherein the preset external reference pressure is transmitted through a tube connected to said external reference pressure inlet.

3. The method according to claim 1 wherein the pressure control chamber stabilizes upon transmission of the preset external reference pressure.

4. The method according to claim 1 wherein the pressure regulator further comprises a piston connected to either the internal or external face of the diaphragm so that when the diaphragm is displaced in one direction, the piston is configured to mechanically restrict water flow at the water inlet and reduce water output pressure, and when the diaphragm is displaced in an opposite direction, the piston is configured to mechanically derestrict the water flow at the water inlet and increase water output pressure.

5. Method according to claim 1, characterized in that said method simultaneously regulates the pressure, by means of the external reference pressure, of multiple pressure regulators, adjusting the water outlet pressure of each said pressure regulators.

6. An apparatus for maintaining a preset water output pressure in an agricultural irrigation system, said apparatus comprising:
- a pressure regulator comprising a water inlet, a water outlet, and an internal pressure control chamber comprising an external reference pressure inlet, a diaphragm connected to a piston, and said pressure control chamber sealed by an O-ring;
- an external reference pressure provided from a pump, a solenoid valve for increasing or reducing pressure in the pressure control chamber based on the presetting external reference pressure;
- wherein said pressure control chamber inlet is configured to receive an external reference pressure selected from the group consisting of pressurized air, water, oil, other liquid, and other gas;
- wherein the pressure control chamber is configured so that transmitting said preset external reference pressure to the pressure control chamber causes movement of the diaphragm, said movement of the diaphragm causing the piston to move linearly forward or backward; and so that simultaneously with the transmitting of said preset external reference pressure, transmitting water to the pressure regulator, said water either exerts a pressure on an external face of the diaphragm so that the external face of the diaphragm moves, and said movement of the diaphragm causes the piston to move linearly forward or backward;
- said apparatus being configured so that when water pressure at the water inlet is greater than the external reference pressure in the pressure control chamber, said water inlet pressure acts on the diaphragm moving the piston toward the water inlet such that water flow at the water inlet is restricted until the water outlet pressure matches the external reference pressure of the pressure control chamber, and if pressure at the water inlet is less than the external reference pressure in the pressure control chamber, said external reference pressure acts on the diaphragm moving the piston toward the water outlet such that water flow at the water inlet is derestricted until the water outlet pressure matches the external reference pressure of the pressure control chamber.

7. The apparatus according to claim 6 wherein a pump is connected to a solenoid valve for increasing or reducing pressure in the pressure control chamber based on the preset external reference pressure.

8. The apparatus according to claim 6 further comprising a tube connected to said external reference pressure inlet through which the preset external reference pressure can be transmitted to said pressure control chamber.

9. The apparatus according to claim 6 further comprising a source of external reference pressure configured to be supplied to the pressure control chamber, wherein said source of external reference pressure is selected from the group consisting of pressurized air, water, oil, other liquid, and other gas.

* * * * *